United States Patent
Zanzig

(10) Patent No.: US 6,612,351 B1
(45) Date of Patent: Sep. 2, 2003

(54) PNEUMATIC TIRE HAVING DUAL AIR RETENTION QUASI ENVELOPES

(75) Inventor: David John Zanzig, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 5 days.

(21) Appl. No.: 09/776,805

(22) Filed: Feb. 5, 2001

(51) Int. Cl.$^7$ .............................................. B60C 11/00
(52) U.S. Cl. .................... 152/209.1; 525/236; 525/235; 525/331.9; 525/332.5; 524/153; 524/151; 524/128; 524/126; 524/495; 524/492
(58) Field of Search .................. 524/128, 126, 524/151, 153, 495, 847, 492; 525/236, 331.9, 332.5, 235; 152/209.1

(56) References Cited

U.S. PATENT DOCUMENTS

| | | | |
|---|---|---|---|
| 3,808,177 A | | 4/1974 | Thaler et al. ............... 260/80.7 |
| 3,909,491 A | * | 9/1975 | Gilles .................. 260/45.8 NT |
| 4,067,933 A | * | 1/1978 | Wilson, Jr. ................... 260/930 |
| 4,584,146 A | * | 4/1986 | Chasar ....................... 558/156 |
| 4,960,830 A | * | 10/1990 | Hazelton et al. ............. 525/196 |
| 5,023,287 A | * | 6/1991 | Evans et al. ................. 524/255 |
| 5,173,522 A | * | 12/1992 | Kubo ........................... 524/62 |
| 5,574,085 A | * | 11/1996 | Knobloch ................... 524/289 |
| 5,574,105 A | * | 11/1996 | Venkataswamy ............ 525/179 |
| 5,852,086 A | * | 12/1998 | Horvath et al. ............. 524/130 |
| 6,147,166 A | * | 11/2000 | Araki et al. ............. 525/332.5 |
| 6,255,389 B1 | * | 7/2001 | Ouhadi et al. ................. 525/76 |
| 6,346,571 B1 | * | 2/2002 | Dharmarajan et al. ........ 525/72 |
| 6,441,070 B1 | * | 8/2002 | Halasa et al. ................ 524/128 |
| 6,515,063 B2 | * | 2/2003 | Zanzig et al. ................ 524/493 |
| 6,525,128 B2 | * | 2/2003 | Zanzig ........................ 524/492 |
| 2002/0143084 A1 | * | 10/2002 | Zanzig ........................ 524/128 |
| 2002/0143095 A1 | * | 10/2002 | Zanzig et al. ................ 524/492 |
| 2002/0144761 A1 | * | 10/2002 | Zanzig et al. ............. 152/209.5 |
| 2002/0147257 A1 | * | 10/2002 | Zanzig et al. ................ 524/128 |
| 2002/0174924 A1 | * | 11/2002 | Zanzig et al. ................ 152/210 |

FOREIGN PATENT DOCUMENTS

| | | | |
|---|---|---|---|
| EP | 775719 | 5/1997 | .............. C08J/3/00 |
| EP | 1 228 900 A2 | * 8/2002 | .............. B60C/1/00 |
| EP | 1 228 901 A2 | * 8/2002 | .......... B60C/11/03 |
| EP | 1 228 902 A2 | * 8/2002 | .......... B60C/11/03 |
| GB | 794630 | 5/1958 | |

OTHER PUBLICATIONS

"A New Isobutylene Copolymer: Non–tire Uses" by D. Kruse and J. Fusco, *Rubber & Plastics New*, Feb. 1, 1993.
"Introduction to Organic Chemistry", $2^{nd}$ Edition, by A. Steitwieser, Jr. and C. H Heathercock, p. 829.

* cited by examiner

*Primary Examiner*—David W. Wu
*Assistant Examiner*—Rip A. Lee
(74) *Attorney, Agent, or Firm*—Henry C. Young, Jr.

(57) ABSTRACT

A pneumatic rubber tire is provided having inner and outer air retention quasi envelopes which individually substantially envelop the tire air chamber and which are comprised of a first inner quasi envelope as an integral innerliner and a second outer quasi envelope as a combination of sidewalls and tread. Such pneumatic tire is of a relatively conventional open toroidal shape. The innerliner and the sidewall-tread combination are termed as being quasi envelopes in a sense that a rigid rim, onto which the tire is to be mounted and inflated, is used to complete the closure of the tire's air chamber envelope.

11 Claims, 1 Drawing Sheet

PNEUMATIC TIRE HAVING DUAL AIR RETENTION QUASI ENVELOPES

BACKGROUND OF THE INVENTION

Figure 1:
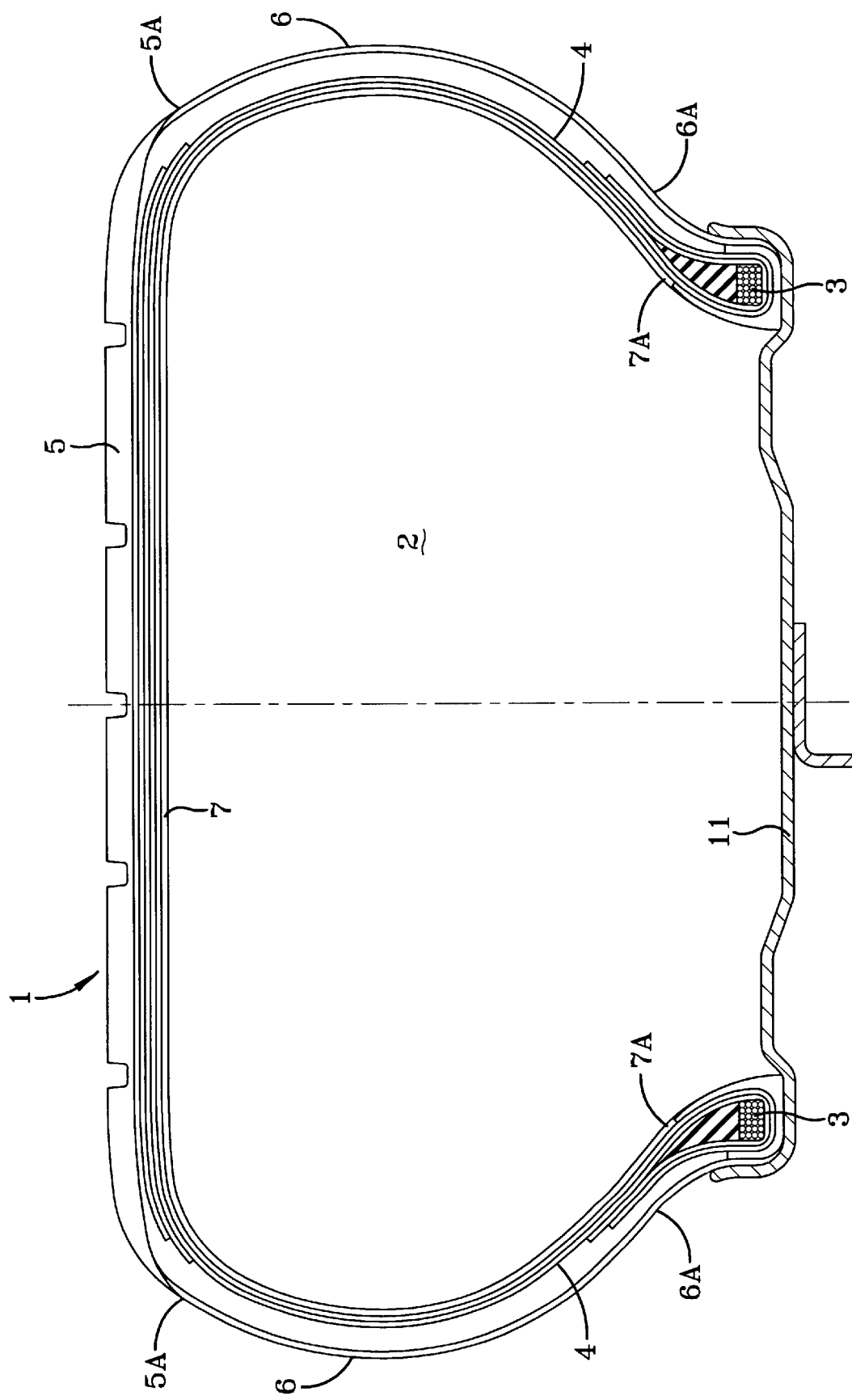

A pneumatic rubber tire is provided having inner and outer air retention quasi envelopes which individually substantially envelop the tire air chamber and which are comprised of a first inner quasi envelope as an integral innerliner and a second outer quasi envelope as a combination of sidewalls and tread. Such pneumatic tire is of a relatively conventional open toroidal shape. The innerliner and the sidewall-tread combination are termed as being quasi envelopes in a sense that a rigid rim, onto which the tire is to be mounted and inflated, is used to complete the closure of the tire's air chamber envelope.

BACKGROUND OF THE INVENTION

A pneumatic rubber is typically of what might be termed an open toroidal shape.

A pneumatic tire is typically composed of two spaced apart, essentially inextensible, bead portions and a carcass extending from bead-to-bead and composed of one or more carcass plies, over which is integrally positioned a circumferential rubber tread and outer rubber sidewalls wherein the sidewalls extend in a radial direction from said bead portions to join the peripheral edges of said tread. The tire also typically contains an innerliner which is a rubber layer designed to assist in retaining air in the enveloped air chamber of the tire and rigid rim onto which the tire is to be mounted and inflated. Such pneumatic tire configuration is well known to those having skill in such art.

In particular the inner liner of a pneumatic rubber tire is a thin rubber layer typically comprised of an elastomeric composition designed to prevent or retard the permeation of air and moisture into the carcass from the tire's inner air chamber. Innerliners have also been used for many years in pneumatic vehicle tires to retard or prevent the escape of air used to inflate the tire, thereby maintaining tire pressure. They may also be used in tires which are designed to run on zero, or at least a very low, inflation pressure. Rubbers which are relatively impermeable to air are often used as a major portion of said innerliners and can include butyl rubber and halobutyl rubbers. U.S. Pat. No. 3,808.177 discloses other polymers which may also be relatively impermeable.

Historically, such saturated butyl rubber and halobutyl elastomers, which inherently do not have carbon-to-carbon double bonds in their backbone, such as halogenated (e.g. brominated) copolymers of isobutylene and p-methyl styrene elastomers, inherently do not effectively respond to sulfur bonding or crosslinking in the manner of unsaturated diene-based elastomers.

In practice, the aforesaid saturated halogenated copolymer elastomer might be prepared, for example, by first copolymerizing isobutylene and p-methyl styrene. Usually a ratio of isobutylene to p-methyl styrene in a range of about 50/1 to about 7/1 is used. The resulting copolymer is then halogenated with a halogen such as bromine which is understood to occur at the paramethyl position, yielding a benzyl bromide functionality. The degree of bromination can typically be varied from about 0.5 to about 2.5, usually preferably about 1.5 to about 2.5, weight percent, based upon the copolymer of isobutylene and p-methyl styrene.

The following reference provides additional information relating to the preparation of such halogenated copolymers:

"A New Isobutylene Copolymer; Non-tire Uses" by D. Kruse and J. Fusco, *Rubber & Plastics News*, Feb. 1, 1993.

Such brominated copolymer of isobutylene and p-methyl styrene may, for example, have physical properties such as, for example, a Mooney viscosity value (ML(1+8) at 125° C.) in a range of about 35 to about 60 and a Tg in a range of about −50° C. to about −60° C.

It is to be appreciated that such halogenated (e.g. brominated) copolymer elastomer has a completely saturated backbone as being devoid of carbon-to-carbon double bond unsaturation and therefore is uniquely useful for a rubber composition where stability of various of its physical properties desired when the rubber composition is exposed to atmospheric conditions which conventionally attack unsaturated diene-based elastomers and particularly oxidative influences of ozone.

However, the utility of such halogenated saturated elastomers is limited where it is desired to use precipitated silica reinforcement in combination with a coupling agents to enhance the silica reinforcement, particularly where well known coupling agents such as, for example, bis(3-trialkoxysilylalkyl) polysulfides which contain an average of 2 to 2.6 or from 3.5 to 4 connecting sulfur atoms in their polysulfide bridges, or mercaptosilanes are used. This is because the lack of carbon-to-carbon double bonds in the saturated elastomers renders such elastomers essentially unreactive with the sulfur moiety of such coupling agents. Therefore, such saturated polymers cannot readily be coupled to the silica with such coupling agents.

Historically, it is observed that some organophosphites have been heretofore recognized as being reactive with alkyl halides. For example, see "Introduction to Organic Chemistry", $2^{nd}$ Edition, by A. Steitwieser, Jr. and C. H. Heathcock, Page 829, which refers to a Arbuzov-Michaelis' reaction of a phosphite with an alkyl halide.

It is contemplated herein to apply such indicated alkyl halide activity of organophosphites for enhancing the utilization of silica reinforcement of rubber compositions which contain a halogenated copolymer of isobutylene and p-methyl styrene.

In the description of this invention, the term "phr" is used to designate parts by weight of a material per 100 parts by weight of elastomer. In the further description, the terms "rubber" and "elastomer" may be used interchangeably unless otherwise mentioned. The terms "vulcanized" and "cured" may be used interchangeably, as well as "unvulcanized" or "uncured", unless otherwise indicated.

DISCLOSURE AND PRACTICE OF INVENTION

In accordance with this invention, a pneumatic rubber tire is provided of an open toroidal shape comprised of a two spaced apart inextensible bead portions with a carcass extending from bead-to-bead to define a tire cavity intend to be closed by a rigid rim positioned from bead-to-bead to form an air-containing envelope, wherein said carcass contains (A) a rubber innerliner on its inner surface, and
(B) a combination of a circumferential rubber tread and pair of rubber sidewalls on the outersurface of said carcass wherein said sidewalls extend radially outward from said bead portions to join the respective peripheral edges of said tread,
  wherein said innerliner, tread and sidewalls are individually comprised of, based upon parts by weight per 100 parts by weight elastomer(s), (phr);

(1) about 20 to 100, alternately about 50 to about 80, phr of halogenated isobutylene copolymer selected from
  (a) halogenated copolymer of isobutylene and isoprene, wherein said halogen is selected from bromine or chlorine, preferably bromine, and wherein the ratio of isoprene to isobutylene is in a range of about 5/100 to about 10/100; or
  (b) halogenated copolymer of isobutylene and p-methylstyrene, wherein said halogen is selected from bromine or chlorine, preferably bromine, and wherein the ratio of isobutylene to p-methylstyrene is in a range of 50/1 to 7/1; and
(2) from zero to about 80, alternately about 20 to about 50, phr of at least one diene-based elastomer;

wherein said innerliner is preferably comprised of from 5 to about 90, alternately about 10 to about 55, phr of said halogenated isobutylene copolymer and, correspondingly about 10 to about 95, alternately about 45 to about 90, phr of said diene-based elastomers;

wherein said innerliner, tread and sidewalls individually contain about 25 to about 100, alternately about 35 to about 90, phr of particulate reinforcing filler comprised of
  (a) from zero to about 100, alternately about 10 to about 85, phr of synthetic amorphous silica aggregates and, correspondingly,
  (b) from zero to about 75, alternately about 10 to about 60 phr of at least one of carbon black and silica treated carbon black having domains of silica on its surface;

wherein said silica aggregates and said silica domains on the surface of said treated carbon black contain hydroxyl groups (e.g. silanol groups) on their surface;

wherein said innerliner, tread and sidewalls individually contain at least one organo phosphite as a coupling agent for said silica and/or silica treated carbon black, as the case may be, preferably in an amount of about 1 to 25, alternately from about 5 to about 15, phr thereof selected from at least one of organo phosphite selected from monophosphites selected from formula (I) and diphosphites selected from formula (II) and diisodecyl pentaerythritol diphosphite, distearyl pentaerythritol diphosphite and pentearythritol diphosphite, preferably monophosphites of formula (I):

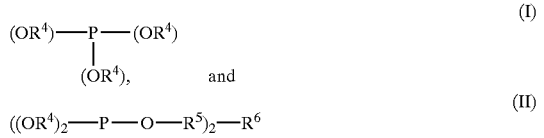

wherein each $R^4$ radical is independently selected from alkyl radicals and phenyl radicals and alkyl substituted phenyl radicals; wherein said $R^4$ alkyl radicals have from 1 to 18 carbon atoms, wherein $R^5$ is a phenyl radical; and wherein $R^6$ is selected from alkyl radicals having from 2 to 8 carbon atoms;

wherein said organo phosphite is preferably the organo phosphite of formula (I)

wherein said organo phosphite is provided by one or more of the following:
  (a) by mixing said organo phosphite with said elastomer(s) and said synthetic silica, preferably in an internal rubber mixer,
  (b) by pre-reacting said halogenated copolymer of isobutylene and p-methyl styrene with said organo phosphite prior to blending said reinforcing filler therewith,
  (c) by pre-reacting said organo phosphite with an aqueous dispersion of colloidal silica particles from which a precipitated silica is recovered to form an organo phosphite/silica composite thereof,
  (d) by mixing said organo phosphite with said elastomer(s) and said synthetic silica, preferably in an internal rubber mixer, according to any of said steps (a), (b) or (c), wherein said synthetic silica includes pre-hydrophobated silica aggregates which have been pre-hydrophobated prior to mixing with said elastomers with an alkylsilane of formula (III),
  (e) by mixing said organo phosphite with said elastomer(s) and an alkylsilane of the said Formula (III) with said elastomer(s) and said synthetic silica, preferably in an internal rubber mixer, and
  (f) by pre-reacting said organo phosphite and said alkylsilane of Formula (III) with
    (i) said aggregates of synthetic precipitated silica or
    (ii) an aqueous dispersion of colloidal silica particles from which a precipitated silica is recovered to form a silica composite thereof;

wherein said alkylsilane of the general Formula (III) is represented by $$X_n\text{—Si—}R_{4-n} \qquad (III)$$

wherein R is an alkyl radical having from one to 18 carbon atoms, n is a value of from 1 to 3 and X is a radical selected from chlorine or bromine or alkoxy radical—as (OR1)-, wherein R1 is an alkyl radical selected from methyl and ethyl radicals, A significant aspect of this invention is the provision of both an innerliner (the inner quasi envelope) and an outer combination of tread and sidewall (the outer quasi envelope) as a combination of dual air barriers for the pneumatic tire.

This is significant because it is considered herein that by use of selective rubber composition for the outer air barrier of the combination of tread and sidewalls, either a more enhanced air barrier effect may be created for the tire or a reduced thickness of the inner air barrier (the tire's innerliner) to thereby result in a more efficient use of a tire inner liner and a reduction in weight of the tire.

In the practice of this invention, said rubber composition may also contain an additional coupling agent as, for example, an alkoxysilyl polysulfide such as for example, a bis(3-trialkoxysilylalkyl) polysulfide wherein alkyl radicals for said alkoxy groups are selected from one or more of methyl and ethyl radicals, preferably an ethyl radical and the alkyl radical for said silylalkyl component is selected from butyl, propyl and amyl radicals, preferably a propyl radical and wherein said polysulfide component contains from 2 to 8, with an average of from 2 to 2.6 or from 3.5 to 4, sulfur atoms in its polysulfidic bridge.

Representative of such other coupling agents are, for example, bis(3-triethoxysilylpropyl) polysulfide having an average of from 2 to 2.6 or from 3.5 to 4, sulfur atoms in its polysulfidic bridge.

Such additional coupling agent may, for example, be added directly to the elastomer mixture or may be added as a composite of precipitated silica and such coupling agent formed by treating a precipitated silica therewith or by treating a colloidal silica therewith and precipitating the resulting composite.

Another significant aspect of this invention is the use of a reaction product of said organo phosphite and a said halogenated (preferably brominated) copolymer of isobutylene and p-methyl styrene in order to improve the polymer (e.g. elastomer) to filler interaction (via reaction of the organo phosphite with the halogen of the halogenated copolymer of isobutylene and p-methyl styrene) to thereby enhance resulting rubber composition properties leading to enhanced tire component (e.g. tire tread) properties including aged performance such as, for example durability and/or stability properties.

Representative examples of organo phosphites understood to be commercially available are, for example for example, triisodecyl phosphite, trilauryl phosphite, tris (tridecyl) phosphite, diphenyl isooctyl phosphite, diphenyl isodecyl phosphite, phenyl diissodecyl phosphite, triphenyl phosphite, triisononylphenyl phosphite, trimethyl phosphite, triethyl phosphite, tris (2-chloroethyl) phosphite, triisopropyl phosphite, tributyl phosphite, trilsooctyl phosphite and tris (2-ethylhexyl) phosphite, as well as tris (2,4-di-t-butylphenyl) phosphite, and bis 2,4,6, tri-t-butylphenyl 2-butyl-2-ethyl-1,3-propanediol phosphite; and diphosphites as, for example, distearyl pentaerythritol diphosphite, bis (2,4-di-t-butylphenyl) pentaerythritol diphosphite, bis (2,6, di-t-butyl-4-methylphenyl) pentaerythritol diphosphite, bis (2,4-dicumylphenyl) pentaerythritol diphosphite and mixtures thereof Such organo phosphite may be, for example, tris (2-ethylhexyl) phosphite or triphenyl phosphite.

Representative examples of alkyl silanes of Formula (III) are, for example, trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

Said additional diene based elastomers may be, for example, polymers and copolymers of isoprene and 1,3-butadiene and copolymers of at least one of isoprene and 1,3-butadiene with a vinyl aromatic compound selected from styrene and alphamethyl styrene, preferably styrene.

Representative of such diene based elastomers are, for example, cis 1,4-polyisoprene (natural or synthetic), cis 1,4-polybutadiene, styrene/butadiene copolymers (aqueous emulsion or organic solution derived copolymers), high vinyl polybutadiene (vinyl content in a range of from 30 to 95 percent), isoprene/butadiene copolymers, styrene/isoprene copolymers and styrene/isoprenetbutadiene terpolymers.

It is to be appreciated that the selection of diene-based elastomer(s) for the tire tread may, and probably in most cases will be, different from the selection for the tire sidewall.

For example, such additional diene-based elastomer for a tire sidewall might be, for example, selected from at least one of cis 1,4-polyisoprene, cis 1,4-polybutadiene and styrene/butadiene rubber (SBR), whether such SBR is prepared by aqueous emulsion polymerization or by organic solvent solution polymerization.

For example, such additional diene-based elastomer for a tire tread might be, for example, selected from at least one of cis 1,4-polyisoprene, cis 1,4-polybutadiene, isoprene/butadiene copolymer, styrene/butadiene copolymer, high vinyl polybutadiene (having a vinyl 1,2-content in a range of from about 30 to about 90 percent thereof), styrene/isoprene copolymer, styrene/isoprene/butadiene terpolymer and 3,4-polyisoprene.

In practice, the innerliner composition is conventionally first prepared as an uncured compounded rubber gum strip, constructed as an inner surface (exposed inside surface) of an uncured rubber tire structure, (carcass), and sulfur co-cured with the tire carcass during the tire curing operation under conditions of heat and pressure. Thus, the innerliner becomes an integral part of the tire by being co-cured therewith as compared to being a simple adherent laminate.

The tread and sidewall rubber compositions are prepared and applied to the carcass.

It is to be understood that the prescribed innerliner, tread and sidewall rubber compositions can be compounded with conventional rubber compounding ingredients comprised of, for example, carbon black, clay, talc, mica, silica, zinc oxide, stearic acid, rubber processing oil, sulfur, accelerator and antidegradant and then typically extruded and/or calendered to form the uncured gum strip. Such rubber compounding materials and methods are well known to those having skill in such art.

The uncured tire carcass rubber interface with which the innerliner is sulfur co-cured can be of various sulfur curable rubber and rubber blends such as, for example, polybutadiene, polyisoprene and styrene/butadiene copolymer rubbers.

Typically the innerliner has an uncured gum thickness, or gauge, in the range of about 0.09 to 0.2 cm, depending somewhat on the tire size, its intended use and degree of air retention desired.

In one aspect of this invention, it is considered that the practice of this invention, namely the use of the said quasi-envelope, enables a use of an innerliner having a maximum thickness of 0.08 centimeters (cm). Such thinner innerliner is viewed as reducing the weight of the innerliner itself as well as promoting a tire with less rolling resistance (e.g. greater hysteresis) as compared to the same tire with the same innerliner but of a greater innerliner thickness (e.g. from 0.09 to 0.2 cm).

In the practice of this invention, by use of the second, outer portion of the envelope, a thinner gauge inner liner may be enabled to be used. In particular the thickness of an innerliner, typically composed of butyl rubber or bromobutyl rubber, may be reduced by at least by at least 10 percent by using a innerliner of the composition of this invention. Accordingly, the innerliner rubber compound may also contain less butyl or halobutyl rubber, as the case may be, in its composition. Thus by the practice of this invention, a lighter and less expensive innerliner may be used as compared to a more common butyl rubber or bromobutyl rubber based innerliner composition. Furthermore, it is considered herein that the innerliner composition of this invention is significantly less hysteretic than a comparable butyl rubber or bromobutyl rubber based tire innerliner, thereby providing less heat build up with lower temperature generation for the tire innerliner and thereby enabling the tire itself to have a greater durability.

For the practice of this invention, it is preferred that the sulfur vulcanized tire innerliner has a maximum thickness of 0.08 cm and therefore of a relatively thin gauge, depending somewhat upon the actual rubber composition and the size of the tire, with a normal butyl rubber or bromobutyl rubber innerliner understood to have a thickness of about 0.09 cm or greater.

The pneumatic tire with the integral innerliner composition may be constructed in the form of a passenger tire, truck tire, or other type of bias or radial pneumatic tire.

For a further understanding of this invention, FIG. 1 (FIG-1) is provided as a cross-sectional view of a pneumatic tire mounted on a rigid rim.

In particular, FIG-1 depicts a cross-sectional view of a tire 1 mounted on a rigid metal rim 11 which encloses an air chamber 2 for the tire/rim assembly 1A.

Components of the tire 1 include spaced apart beads 3, supporting carcass plies 4 extending from bead-to-bead, a circumferential tread 5 supported by the carcass 4, and sidewalls 6 extending radially from said beads 3 to said tread 5.

in particular, said tire includes an innerliner 7 positioned on the inner surface of said carcass 4 and extending to a region 7A in the vicinity of the bead portions 3 in a form of that is carcass 4 and extending to a region 7A in the vicinity of the bead portions 3 in a form of that is referred to herein as an inner quasi envelope (namely the innerliner 7) for the said air chamber 2, with the bead portions 3 and supporting rim 11 actually completing the air chamber 2.

In particular, said sidewalls 6 extend from a region 6A in the vicinity of the bead portions 3 to the peripheral edges 5A of the tread 5 in a form of what is referred to herein as an outer quasi envelope for said air chamber 2, with the bear portions 3 and supporting rim actually completing the air chamber.

The rubber composition of the inner liner 7 for this invention has a significant degree of air impermeability comprised of a layer of a halogenated butyl rubber(e.g. a brominated or chlorinated copolymer of isobutylene and isoprene) or brominated copolymer of isobutylene and p-methyl styrene and thus is considered to be a suitable air barrier to inhibit escape of air from the air chamber 2 insofar as the tire 1 is concerned in a form of what is referred to herein as an inner quasi envelope (namely the innerliner 7) for the tire.

The rubber compositions of the tread 5 and sidewalls 6 have a significant degree of air impermeability and comprised of a blends of a brominated copolymer of isobutylene and p-methylstyrene and diene-based elastomer which is considered herein to from a suitable air barrier to inhibit escape of air from the air chamber 2 insofar as the tire 1 is concerned in a form of what is referred to herein as outer quasi envelope (namely the combination of said sidewalls 6 and tread 5) for the tire 1.

The following examples are presented to demonstrate the invention. The parts and percentages are by weight unless otherwise noted.

EXAMPLE I

Samples of rubber compositions are prepared and identified herein as Samples A to C, with Sample A being a Control Sidewall Sample.

In particular, Sample A was composed of cis 1,4-polybutadiene and natural rubber. Sample B was composed of cis 1,4-polybutadiene and brominated copolymer of isobutylene and p-methylstyrene (BIMS). Sample C was composed of natural rubber, cis 1,4-polybutadiene and brominated copolymer of isobutylene and p-methylstyrene (BIMS).

The materials were mixed as a two-step mixing process in an internal rubber mixer in which all of the ingredients were mixed in the first step except for sulfur, accelerators and zinc oxide which were added and mixed in the second step. The first mixing step was conducted for about 4 minutes to a temperature of about 166° C. The second mixing step, for the sulfur and accelerators, was conducted for about 2 minutes to a temperature of about 110° C.

Ingredients for the Samples are shown in the following Table 1, with the parts being by weight.

TABLE 1

| Ingredients | Control Sample A (Sidewall) | Sample B (Sidewall) | Sample C (Sidewall) |
| --- | --- | --- | --- |
| Cis 1,4 polybutadiene[1] | 65 | 50 | 42 |
| Brominated copolymer[2] | 0 | 50 | 50 |
| Natural rubber[3] | 35 | 0 | 8 |
| N330 carbon black[4] | 0 | 40 | 40 |
| N550 carbon black[4] | 51 | 0 | 0 |
| Zinc oxide | 3.5 | 0.75 | 0.75 |
| Stearic acid | 1 | 0.5 | 0.5 |
| Processing aids, oils, waxes | 18 | 23 | 23 |
| Antidegradants[5] | 5 | 0 | 0 |
| Sulfur | 2 | 0.3 | 0.3 |
| Vulcanization accelerators | 0.5 | 1.4 | 1.4 |

[1]As Budene 1207 from The Goodyear Tire & Rubber Company
[2]Brominated copolymer of isobutylene and p-methylstyrene from the ExxonMobil Chemical Company (0.87% bromine, 12% p-methylstyrene)
[3]Cis 1,4 polyisoprene
[4]N330 and N550 carbon blacks, as ASTM designation
[5]Paraphenylene diamine type The rubber Samples were vulcanized at atemperature of about 170° C. for about 11 minutes and various of the physical properties of the Samples are shown in the following Table 2.

TABLE 2

| Physical Tests | Control Sample A | Sample B | Sample C |
| --- | --- | --- | --- |
| Rheometer 170° C. | | | |
| Minimum torque (dN/m) | 7.5 | 6.1 | 5.8 |
| Maximum torque (dN/m) | 25.4 | 22.9 | 21.7 |
| T25 (minutes) | 2.4 | 3 | 3.5 |
| T90 (minutes) | 5.9 | 14.2 | 10.3 |
| Stress-strain (original - not aged) | | | |
| 100% modulus (MPa) | 1 | 1.2 | 1.1 |
| 200% modulus (MPa) | 2.1 | 2.5 | 2.5 |
| 300% modulus (MPa) | 4.3 | 4.6 | 4.5 |
| Tensile strength (MPa) | 12.6 | 12.6 | 12.1 |
| Elongation at break (%) | 626 | 677 | 641 |
| Hardness, Shore A (original - not aged) | | | |
| 23° C. | 48.2 | 52.8 | 51.8 |
| 100° C. | 42.5 | 43 | 42.3 |
| Rebound | | | |
| 23° C. | 58.1 | 23.9 | 23.8 |
| 100 C. | 58.9 | 55.2 | 55.5 |
| Stress-strain (after aged 7 days in air @ 100° C.) | | | |
| 100% modulus (Mpa) | 3.8 | 2 | 1.8 |
| 200% modulus (MPa) | 10.1 | 4.7 | 4.3 |
| 300% modulus (MPa) | 0 | 7.9 | 7.5 |
| Tensile strength (MPa) | 10 | 13.4 | 12.2 |
| Elongation at break (%) | 218 | 523 | 506 |
| Hardness, Shore A (after aged 7 days in air @ 100° C.) | | | |
| 23° C. | 67 | 62.2 | 59.8 |
| 100° C. | 60.8 | 53.6 | 50.3 |
| Air Permeability[1] (cc × mils)/ (645 cm² × days at atmospheric pressure) | 1927 | 620 | 534 |
| Monsanto fatigue-to-failure (cycles) | 1440 No failure | 1440 No failure | 1440 No failure |
| Dynamic ozone test[2] (21 days, 50 PPHM ozone 25% extension, | Broke brown | No breaks/ cracks | No breaks/ cracks |

TABLE 2-continued

| Physical Tests | Control Sample A | Sample B | Sample C |
|---|---|---|---|
| 40° C.) | appearance | excellent appearance | excellent appearance |

[1]Air permeability determined by loading a thin rubber sample between two halves of an air tight cell which is then bolted together. The cell has an air supply attached to one side and an output line attached to a precision capillary manometer on the opposite side of the cell. 48 psi (331 kPa) air is applied to the supply side of the cell; as air permeates through the sample. The volume change is measured on the monometer and recorded in alaboratory computer which then calculates the permeability using custom data analysis software. This test is used to determine the volume of air that permeates through a thin rubber sample in a given time under specific conditions. Permeability is defined as the volume of air in cubic centimeters at 23° C. and 1 ATM diffusing through 100 square inches (645 cm$^2$) of .001 inch (0.00254 cm) thick material under a pressure differential of1 ATM in one day.
[2]The ozone test is conducted by repeatedly flexing rectangular specimens (12.7 mm × 150 mm × 2 mm) to 25 percent extension for 21 days with the results being visually observed every 48 hours. This is believed to be a test well understood by those skilled in such art.

It can be seen from Table 2 that the experimental sidewall Samples B and C have similar physical properties, but significantly better air retention compared to the representative Control sidewall Sample A. It can also be seen from Table 2 that the experimental sidewall Samples B and C have better aged physical properties than the Control Sample A.

The experimental samples B and C retained their black color. They did contain amine based antidegradants which would be expected to tend to discolor or turn the Samples to a brown color with age, as did Sample A which contained an amine-based antidegradant. This is considered herein to be significant because aged tire appearance is important in that it is desired that the aged samples remain black in color and not acquire a brown color.

Experimental sidewall Samples B and C exhibited improved dynamic ozone resistance (the Samples were not observed to break or crack) as compared to the representative Control Sample A. This is considered herein to be significant because the data is predictive of better tire durability by not evidencing cracking and therefore predictive of longer life for tire component(s) of such compositions.

EXAMPLE II

Samples X and Y are reported herein as rubber samples which contain a brominated copolymer of isobutylene and para-methyl stryene rubber (also referred to as "BIMS" rubber) as well as at least one diene-based elastomer and silica reinforcement. Sample B also contained an organo phosphite, namely triphenyl phosphite, as a coupling agent for said BIMS.

For the Samples X and Y, a total of three non-productive mixing steps were used for the silica reinforced rubber compositions. The rubber compositions were dumped from the rubber mixer after each mixing step, sheeted out from an open mill and allowed to cool to below 40° C. after each mixing step.

The representative rubber compositions shown are in the following Table 3 where the Samples X and Y utilized the silica reinforcement together with a paraffinic rubber processing oil, non-staining phenolic antioxidant.

The non-productive mixing steps were for about 5 minutes to a temperature of about 160° C. The productive mixing step was for about 2 minutes to a temperature of about 115° C.

Table 3 illustrates the ingredients used for preparing the rubber compositions of Samples X and Y.

TABLE 3

|  | Sample X | Sample Y |
|---|---|---|
| First Non-Productive Mixing Step (to 160° C.) | | |
| BIMS rubber[1] | 40 | 40 |
| Polybutadiene rubber[2] | 30 | 30 |
| Polyisoprene rubber | 30 | 30 |
| Silica[3] | 66 | 66 |
| Paraffinic processing oil | 25 | 25 |
| Phosphite[4] | 0 | 10 |
| Second Non-Productive Mixing Step (160° C.) | Yes | Yes |
| Zinc Oxide | 2.5 | 2.5 |
| Antidegradants[8] | 3.0 | 3.0 |
| Carbon black[6] | 10 | 10 |
| Productive Mixing Step (to 115° C.) | | |
| Accelerator(s)[7] | 3.5 | 3.5 |
| Sulfur | 2.2 | 2.2 |

[1]Brominated copolymer of isobutylene and para-methyl stryene rubber obtained as Exxpro 3745 from the ExxonMobil Chemical Company
[2]Cis 1,4-polybutadiene rubber obtained as Budene 1207 from The Goodyear Tire & Rubber Company
[3]Obtained as Zeopol ® 8715 from the J. M. Huber Corporation
[4]Triphenyl phosphite
[5]P-phenylenediamine type
[6]N472 carbon black, as ASTM designation, obtained as Vulcan XC-72 from Cabot Corporation
[7]Sulfenamide and diphenylguanidine or tetramethylthiuram disulfide type
[8]Mixed diaryl-p-phenylenediamine type antioxidant from The Goodyear Tire & Rubber Company An aromatic rubber processing oil was used which can be characterized as 40 percent to 41 percent aromatic, 21 percent to 26 percent naphthenic and 34 percent to 38 percent paraffinic. A paraffinic rubber processing oil was used which can be characterized as 46 percent to 51 percent paraffinic, 36 percent to 42 percent naphthenic and 11 percent to 14 percent aromatic.

The rubber compositions of Table 1 were cured for about 14 minutes at about 160° C. Various resulting physical properties are shown in the following Table 4.

TABLE 4

|  | Sample X | Sample Y |
|---|---|---|
| Stress Strain (Modulus) | | |
| 100% modulus (MPa) | 1.6 | 1.2 |
| 300% modulus (MPa) | 8.5 | 4.8 |
| Tensile strength (MPa) | 11.5 | 10.9 |
| Elongation at break, (%) | 417 | 617 |
| Energy, J | 83.7 | 127.2 |
| Rebound | | |
| 23° C. | 44 | 33 |
| 100° C. | 67 | 49 |
| Hardness | | |
| Shore A, 23° C. | 58 | 62 |
| Shore A, 100° C. | 51 | 51 |
| DIN Abrasion (10 N force) (cm$^3$ loss) | 172 | 132 |
| Peel Adhesion (95° C.), N | 38 | 159 |

From Table 4 it is seen that tear strength, as measured in a peel adhesion test, and abrasion resistance of Sample Y are improved as compared to Sample A which is indicative of improved durability of the rubber composition.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber tire of an open toroidal shape comprised of a two spaced apart inextensible bead portions with a carcass extending from bead-to-bead to define a tire cavity intend to be closed by a rigid rim positioned from bead-to-bead to form an air-containing envelope, wherein said carcass contains (A) a rubber innerliner on its inner surface, and (B) a combination of a circumferential rubber tread and pair of rubber sidewalls on the outer surface of said carcass wherein said sidewalls extend radially outward from said bead portions to join the respective peripheral edges of said tread, wherein said innerliner, tread and sidewalls are individually comprised of, based upon 100 parts by weight of halogenated isobutylene copolymer and diene-based elastomer(s) (phr);

(1) about 20 to 100 parts by weight of halogenated isobutylene copolymer selected from (a) halogenated copolymer of isobutylene and isoprene, wherein said halogen is bromine or chlorine, and wherein the ratio of isoprene to isobutylene is in a range of about 5/100 to about 10/100; or (b) brominated copolymer of isobutylene and p-methylstyrene, and wherein theratio of isobutylene to p-methylstyrene is in a range of 50/1 to 7/1; and (2) from zero to about 80 parts by weight of at least one diene-based elastomer;

wherein said innerliner is comprised of from 5 to about 90 parts by weight of said halogenated isobutylene copolymer and, correspondingly about 10 to about 95 parts by weight of said diene-based elastomers;

wherein said innerliner, tread and sidewalls individually contain about 25 to about 100 parts by weight of particulate reinforcing filler comprised of (a) from about 10 to about 85 parts by weight of synthetic amorphous silica aggregates and, correspondingly, (b) from about 10 to about 60 parts by weight of at least one of carbon black and silica treated carbon black having domains of silica on its surface;

wherein said silica aggregates and said silica domains on the surface of said treated carbon black contain hydroxyl groups on their surface;

wherein said innerliner, tread and sidewalls individually contain at least one organo phosphite as a coupling agent for said synthetic silica aggregates and/or silica treated carbon black selected from monophosphites selected from formula (I) and diphosphites from formula (II) and diisodecyl pentearythritol diphosphite, distearyl pentaerythritol diphosphite and pentearythritol diphosphite:

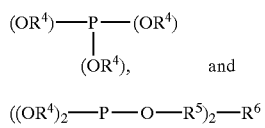

wherein each $R^4$ radical is independently selected from the group consisting of alkyl radicals phenyl radicals and alkyl substituted phenyl radicals; wherein said $R^4$ alkyl radicals have from 1 to 18 carbon atoms, wherein $R^5$ is a phenyl radical; and wherein $R^6$ is selected from alkyl radicals having from 2 to 8 carbon atoms;

wherein said organo phosphite is provided by one or more of the following:

(a) by mixing said organo phosphite with said halogenated isobutylene copolymer and diene-based elastomer(s) and said synthetic silica aggregates, (b) by pre-reacting said halogenated copolymer of isobutylene and p-methyl styrene with said organo phosphite prior to blending said particulate reinforcing filler therewith, (c) by pre-reacting said organo phosphite with an aqueous dispersion of colloidal silica particles from which a precipitated silica is recovered to form an organo phosphite/silica composite thereof, (d) by mixing said organo phosphite with said halogenated isobutylene copolymer and diene-based elastomer(s) and said synthetic silica aggregates according to any of said steps (a),(b) or (c), wherein said synthetic silica aggregates are comprised of pre-hydrophobated silica aggregates which have been pre-hydrophobated prior to mixing with said halogenated isobutylene copolymer and diene-based elastomers with an alkylsilane of formula (III), (e) by mixing said organo phosphite with said halogenated isobutylene copolymer and diene-based elastomer(s) and an alkylsilane of the said Formula (III) with said elastomer(s) and said synthetic silica aggregates, and ((f) by pre-reacting said organo phosphite and said alkylsilane of Formula (III) with (i) said synthetic silica aggregates or (ii) an aqueous dispersion of colloidal silica particles from which a precipitated silica is recovered to form an orgariophosphite/silica composite thereof;

wherein said alkylsilane of the general Formula (III) is represented by

wherein R is an alkyl radical having from one to 18 carbon atoms, n is a value of from 1 to 3 and X is a radical selected from chlorine or bromine or alkoxy radical, wherein said alkoxy radical is represented as -($OR^1$)-, wherein $R^1$ is an alkyl radical selected from the group consisting of methyl and ethyl radicals.

2. The tire of claim 1 wherein the thickness of said innerliner is a maximum of 0.08 cm.

3. The tire of claim 1 wherein said halogenated isobutylene copolymer of isobutylene and isoprene is a brominated copolymer of isobutylene and isoprene.

4. The tire of claim 1 wherein said halogenated isobutylene copolymer is a brominated copolymer of isobutylene and p-methylstyrene.

5. The tire of claim 1 wherein said organo phosphite is selected from the group consisting of one of at least triisodecyl phosphite, trilauryl phosphite, tris(tridecyl) phosphite, diphenyl isooctyl phosphite, diphenyl isodecyl phosphite, phenyl diissodectyl phosphite, triphenyl phosphite, triisononylphenyl phosphite, trimethyl phosphite, triethyl phosphite, tris (2-chloroethyl) phosphite, triisopropyl phosphite, tributyl phosphite, triisooctyl phosphite and tris (2-ethylhexyl) phosphite, tris (2,4-di-t-butylphenyl) phosphite, bis2,4,6, tri-t-butylphenyl-2-butyl-2-ethyl-1,3-propanediol phosphite, distearyl pentaerythritol diphosphite, bis (2,4-di-t-butylphenyl) pentaerythritol diphosphite, bis (2,6,di-t-butyl-4-methylphenyl pentaerythritol diphosphite, bis (2,4-dicumylphenyl) pentaerythritol diphosphite and mixtures thereof.

6. The tire of claim 1 wherein said organo phosphite is tris (2-ethylhexyl) phosphite or triphenyl phosphite.

7. The tire of claim 1 wherein said alkyl silane is selected from the group consisting of at least one of trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

8. The tire of claim 5 wherein said alkyl silane is selected from the group consisting of at least one of trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

9. The tire of claim 3 wherein:
(A) said organo phosphite is selected from the group consisting of at least one of triisodecyl phosphite, trilauryl phosphite, tris(tridecyl) phosphite, diphenyl isooctyl phosphite, diphenyl isodecyl phosphite, phenyl diissodecyl phosphite, triphenyl phosphite, tri-isononylphenyl phosphite, trimethyl phosphite, triethyl phosphite, tris (2-chloroethyl) phosphite, triisopropyl phosphite, tributyl phosphite, triisooctyl phosphite and tris (2-ethylhexyl) phosphite, tris (2,4-di-t-butylphenyl) phosphite, bis 2,4,6, tri-t-butylphenyl 2-butyl-2-ethyl-1,3-propanediol phpsphite, distearyl pentaerythritol diphosphite, bis (2,4-di-t-butylphenyl) pentaeiythriol diphosphite, bis (2,6, di-t-butyl-4-methylphenyl pentaerythritol diphosphite, bis (2,4-dicumylphenyl) pentaerythritol diphosphite and mixtures thereof, and (B) said alkyl silane is selected from the group consisting of at least one of trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

10. The tire of claim 4 wherein:
(A) said organo phosphite is selected from the group consisting of at least one of triisodecyl phosphite, trilauryl phosphite, tris(tridecyl) phosphite, diphenyl isooctyl phosphite, diphenyl isodecyl phosphite, phenyl diissodecyl phosphite, triphenyl phosphite, tri-isononylphenyl phosphite, trimethyl phosphite, triethyl phosphite, tris (2-chloroethyl) phosphite, triisopropyl phosphite, tributyl phosphite, triisooctyl phosphite and tris (2-ethylhexyl) phosphite, tris (2,4-di-t-butylphenyl) phosphite, bis 2,4,6, tri-t-butylphenyl 2-butyl-2-ethyl-1,3-propanediol phosphite, distearyl pentaerythritol diphosphite, bis (2,4-di-t-butylphenyl) pentaerythritol diphosphite, bis (2,6, di-t-butyl-4-methylphenyl pentaerythritol diphosphite, bis (2,4-dicumylphenyl) pentaerythritol diphosphite and mixtures thereof, and (B) said alkyl silane is selected from the group consisting of at least one of trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

11. The tire of claim 8 wherein said halogenated isobutylene copolymer is a brominated copolymer of isobutylene and isoprene.

* * * * *